Feb. 7, 1967  A. K. REED ETAL  3,303,042
METHOD FOR PHOSPHOR COATING A FLUORESCENT
TUBE OF IRREGULAR SECTION
Filed May 24, 1963
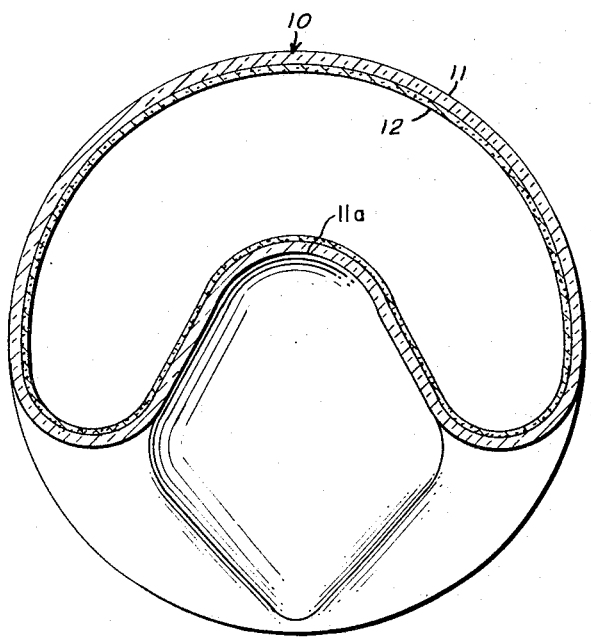
INVENTORS
Robert W. Repsher
and Allan K. Reed
BY
W. D. Palmer 3,303,042
METHOD FOR PHOSPHOR COATING A FLUORESCENT TUBE OF IRREGULAR SECTION
Allan K. Reed, Belleville, and Robert W. Repsher, Kinnelon Township, Morris County, N.J., assignors to Westinghouse Electric Corporation, East Pittsburgh, Pa., a corporation of Pennsylvania
Filed May 24, 1963, Ser. No. 283,058
4 Claims. (Cl. 117—33.5)

This invention relates to phosphor coating suspensions having unique physical properties and to the use of such suspensions to coat the interior surfaces of the light-transmitting envelopes of fluorescent lamps.

In the manufacture of fluorescent lamps, the phosphor is generally applied to the interior surface of the envelope as a suspension in a volatile organic vehicle such as xylene or butyl acetate. A binder, such as ethylcellulose or nitrocellulose, is included in the suspension to control the viscosity. The suspension may be applied by flushing or spraying it into the tube. Subsequently, the tube is allowed to dry in air to remove the volatile solvent and then baked (lehred) in an oven at a high temperature (e.g., about 650° C.) to burn off the organic binder.

In coating a fluorescent lamp tube having an irregular cross section, it is very difficult to obtain a uniform coating using the usual phosphor coating suspension. These suspensions, regardless of their viscosity, exhibit what is known as Newtonian flow which is the deformation of fluids that occurs in such a manner that the rate of strain in shear is proportional to the shearing stress. This means that these suspensions, when used to coat fluorescent tubes, continue to flow until they are dry. Since coatings in tubes of irregular cross section do not dry uniformly, part of the coating is still flowing when that immediately below it is dry. The wet suspension flowing over the dried or almost dried coating causes the final coating to be uneven.

It is an object of this invention to provide a phosphor suspension which will not exhibit Newtonian flow. It is another object of this invention to provide a method of applying a uniform and even phosphor coating to the interior surfaces of the light-transmitting envelope of fluorescent lamps, and particularly to fluorescent lamp tubes having irregular cross-sectional shapes.

These and other objects are accomplished by the practice of this invention which, briefly, comprises providing an aqueous suspension comprising from about 25 to 50% by weight of a phosphor and from about 0.1 to 0.6% by weight of a water soluble polymer containing recurrent

groups. This composition is used to coat the interior surfaces of the envelope for a fluorescent lamp, and, especially a fluorescent lamp tube having an irregular cross-sectional shape.

The aspects of this invention which are capable of illustration are shown in the accompanying drawing which is a cross-sectional view of a fluorescent lamp tube having an irregular cross-sectional configuration.

As illustrated in the drawing, the fluorescent lamp tube 10 comprises a generally tubular glass envelope 11 which is coated on the inner surface with a layer of phosphor material 12. The upper portion of the glass envelope 11 is round. However, the lower portion is of an irregular cross-sectional configuration which rises to a peak 11a. The peak 11a becomes continuously lower towards the end of the tube 10 and the lower portion of the glass envelope 11 eventually becomes round. Such tubes are described in detail in U.S. Patent 2,915,664, the disclosure of which is incorporated herein by reference.

In accordance with the practice of this invention, the phosphor which is used in the suspension may be any of those conventionally used in the production of fluorescent lamp tubes such as, for example, calcium barium silicate, calcium lead manganese silicate, zinc orthosilicate, magnesium tungstate, calcium lead tungstate, cadmium borate, etc.

The water soluble polymer containing recurrent

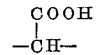

groups is preferably a carboxypolymethylene which is identified by the trademark of Carbopol. These compounds are advantageously prepared by polymerizing acrylic acid. Subsequently the product may be cross-linked with from about 0.75 to 2.0% by weight of a polyhydroxy compound such as polyallyl sucrose. Such a procedure is described in U.S. Patents 2,909,462 and 2,912,358, the disclosures of which are incorporated herein by reference. Some specific materials which may be used are Carbopol–934, Carbopol–940, Carbopol–941 and Carbopol–952. Carbopol–934, for example, may be produced by polymerizing acrylic acid with about 1% of its weight of polyallyl sucrose having an average of about 5.8 allyl groups attached through other linkages to each molecule of sucrose. The polymerization of the acrylic acid monomer is conducted in the presence of toluene diluent and 1% of benzoyl peroxide catalyst in a sealed reaction vessel in accordance with the process described above. After the polymerization has been completed, the toluene is removed by filtration and the cross-linked polymer, which is a white powder having a maximum particle size of 10 mesh and a bulk density of about 12 pounds per cubic foot, is then obtained.

In a preferred embodiment of this invention, there is included in the aqueous suspension from about 0.3 to 1.8% by weight of an interpolymer containing a plurality of groups of the general formula:

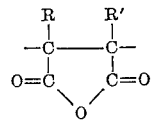

in which R and R' each represents a hydrogen atom or a lower alkyl group. Such an interpolymer may be obtained by the addition polymerization of (A) an ethylenically unsaturated dicarboxylic anhydride, such as maleic anhydride, methyl maleic anhydride (citraconic anhydride), ethyl maleic anhydride, etc., with (B) a monomer containing a terminal ethylenic group, $CH_2\!=\!C\!=\!$, such as styrene, vinyl acetate, vinyl toluene, acrylic or methacrylic acid or lower alkyl esters thereof, lower alkyl vinyl ethers, etc. The presence of this copolymer in the composition prevents flocculation of the phosphor which otherwise may occur in its absence. Moreover, such a copolymer decreases the viscosity of the aqueous suspension, results in a better texture in the dried coating and prevents localized peeling of the dried coating. The copolymer is preferably used in an amount of about 3 times the weight of the polymer containing recurrent

groups.

It is preferred to add a small amount (i.e., less than about 1% by weight) of a wetting agent to aid in dispersion of the phosphor and to help the suspension wet the glass. Any material which is conventionally known to be useful as a wetting agent and which will reduce the surface tension of the suspension but which does not carry with it a large amount of ash is suitable. For example, alkylphenoxypoly (ethyleneoxy) ethanols obtained by the reaction of an alkyl phenol with polyoxyethylene glycol, may be used. These compounds have the general formula $RC_6H_4O(CH_2CH_2O)_nCH_2CH_2OH$ in which $n$ is a whole integer and R is $C_8H_{17}$ or a higher homolog thereof, and such compounds are available under the trademark Igepal. Each series of Igepal wetting agents consists of combinations of a given alkylphenol with different percentages of ethylene oxide. Thus, Igepal CO 610 and Igepal CO 530 both contain the nonylphenol group (i.e., R in the above formula is $C_9H_{19}$). However, the former compound consists of 61% combined ethylene oxide based on the weight of the nonylphenol; whereas the latter compound consists of 53% combined ethylene oxide based on the weight of the nonylphenol. Other wetting agents which may be used include cetyl or stearyl monoamine hydrochloride or acetate, dodecyl amine, hexadecyl amine; polyoxyethylene derivatives of a sorbital fatty acid ester such as polyoxyethylene sorbitan monostearate or polyoxyethylene sorbitan trioleate; etc.

A small amount of an alkaline material such as ammonium hydroxide or an amine may advantageously be included to promote phosphur dispersion. The alkaline material may be used in an amount of up to 0.5% by weight of the dispersion and a specific example is 0.3% by weight of conc. ammonium hydroxide.

The glass envelope 11 of the fluorescent lamp tube 10 may be coated with a layer of phosphur material 12 by flushing an aqueous phosphur suspension, prepared in accordance with this invention, into the tube by air pressure and then allowing it to drain out. Another method is to spray the suspension on the inside of the top of the tube and permitting it to drain downward. The tube 10 is then dried and baked (lehred) to remove the water and to oxidize all residual organic material.

The aqueous suspensions of this invention do not exhibit Newtonian flow—i.e., the flow of these suspensions is not directly proportional to applied stress. After such a suspension has drained in a fluorescent tube for a time, the flow stops even though it has not dried. Moreover, these suspensions have "yield values"—i.e., flow does not start until a certain minimum stress is applied. Therefore, when these suspensions are used to apply a phosphor coating to the interior surface of the transparent envelope of a fluorescent lamp tube, and particularly to a fluorescent lamp tube having an irregular cross-sectional shape, a uniform and even coating is obtained.

Furthermore, the suspensions of this invention have the advantage of being non-settling and therefore do not require constant agitation to maintain the suspension. Therefore, foaming of the suspension, and consequent pinhole bubbles in the final coating, which would result from constant agitation of the suspension, is avoided.

Considering the components comprising the coating composition and their relationship to one another, a predetermined proportion of the finely divided phosphor to be coated is suspended in the liquid medium of the coating composition. This liquid medium comprises the water vehicle which has dissolved therein a predetermined proportion, such as 0.3 percent by weight of the coating composition, of the viscosity-imparting and flow-modifying polymer, such as the carboxypolymethylene. This polymer imparts to the coating composition a predetermined viscosity, an example being 720 centipoises at normal room temperature; as measured on a Brookfield viscosimeter 30 r.p.m. When applied as a thin layer, such as 2 mm. thick for example, to the interior surface of a fluorescent tube, the coating composition will flow freely at first, but as the film becomes thinner, the stress on the film becomes less than the yield value and the still-wet coating composition "sets" and will not flow. The resulting coating is evenly applied over the irregular tube.

When a coating system exhibits so-called "Newtonian" flow, the coating deposits as a wet film and will flow down the side of the coated tube. The rate of flow is slowed primarily by evaporation of solvent, which increases the concentration of the non-volatiles in the coating and consequently the viscosity. With a system such as the present one, which displays a "yield value" below which the coated film will not flow, the rate of flow of the coated film is also slowed to some degree by evaporation of solvent. However, once the applied shear stress which causes flow drops below a certain value, the viscosity will, in effect, increase to infinity. Thus the applied coating film will flow until the thickness of the deposited film is reduced to a predetermined value, after which the coating will no longer flow, but sets immediately to form a uniform film deposit.

The following examples illustrate the best modes contemplated for carrying out this invention.

*Example 1*

Carbopol–952 (0.3 part by weight) is added to water (64.2 parts by weight) while stirring vigorously. Phosphur (35.0 parts by weight) is then added while stirring vigorously and agitation is continued until the phosphor powder is well dispersed. To this suspension are added Igepal CO 610 (0.2 part by weight) and concentrated ammonium hydroxide (0.3 part by weight). The suspension is stirred until uniformly mixed and then allowed to stand until the air bubbles entrained during the agitation have risen to the surface and broken. It is not necessary to keep the mixture agitated to prevent settling of the phosphur particles. The suspension is then flushed over the inner surface of the glass envelope of a fluorescent lamp bulb having a cross-sectional shape as shown in the drawing. The bulb is then heated to a temperature of about 650° C. for about 3 minutes in order to dry the phosphor coating and to oxidize the residual organic material. The phosphor coating is completely uniform on all portions of the interior surface of the glass envelope.

*Example 2*

Carbopol–941 (1.25 gm.) is dissolved in 500 cc. of water and the solution is heated to boiling. In this solution, there are dissolved 3.75 gm. of Gantrez AN–169 (a copolymer of methylvinyl ether and maleic anhydride). There are then added sequentially 5 cc. of ammonium hydroxide, 0.5 cc. of Igepal CO 530 and 250 gm. of phosphor. The mixture is agitated to achieve a uniform dispersion. The resultant suspension has a very good viscosity and, when used to coat the interior surface of a fluorescent tube having an irregular cross-sectional shape, gives a uniform phosphor coating of excellent texture.

While the invention has been described with respect to what is at present considered to be the preferred embodiments thereof, it will be understood, of course, that substitutions, modifications, changes, and the like may be made therein without departing from the true scope.

We claim:
1. The method of phosphor coating the interior surface of a fluorescent lamp tube which has an irregular cross section, which method comprises:
   (a) flowing over the interior tube surface to be coated a coating composition comprising:
       (1) from about 25% to 50% by weight of inorganic phosphor to be coated,
       (2) from about 0.1% to 1% by weight of a water soluble polymer of acrylic acid crosslinked with from about 0.75% to 2% of polyallyl sucrose,
       (3) from about 0.3% to 1.8% by weight of an interpolymer containing a plurality of groups of the general formula:

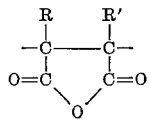

in which R and R' each represent at least one of the group consisting of a hydrogen atom and a lower alkyl group, and said interpolymer having been formed by the addition polymerization of (A) one of the group consisting of maleic anhydride, methyl maleic anhydride, and ethyl maleic anhydride with (B) a monomer of one of the group consisting of styrene, vinyl acetate, vinyl toluene, acrylic acid and methacrylic acid, and (4) the balance being water;

(b) volatilizing the water from the deposited coating; and (c) lehring the coated tube to complete the vaporization of any residual water and to volatilize organic material from the deposited phosphor coating.

2. The method of phosphor coating the interior surface of a fluorescent lamp tube which has an irregular cross section, which method comprises:

(a) flowing over the interior tube surface to be coated a coating composition consisting essentially of:
  (1) from about 25% to 50% by weight of inorganic phosphor to be coated,
  (2) from about 0.1% to 1% by weight of a water soluble polymer of acrylic acid crosslinked with from about 0.75% to 2% of polyallyl sucrose,
  (3) from about 0.3% to 1.8% by weight of an interpolymer containing a plurality of groups of the general formula:

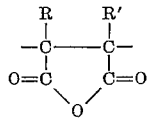

in which R and R' each represent at least one of the group consisting of a hydrogen atom and a lower alkyl group, and said interpolymer having been formed by the addition polymerization of (A) one of the group consisting of maleic anhydride, methyl maleic anhydride, and ethyl maleic anhydride with (B) a monomer of one of the group consisting of styrene, vinyl acetate, vinyl toluene, acrylic acid and methacrylic acid, (4) up to 1% by weight of a wetting agent,
(5) up to 0.5% by weight of an alkaline material, and
(6) the balance being water;

(b) volatilizing the water from the deposited coating; and (c) lehring the coated tube to complete the vaporization of any residual water and to volatilize organic material from the deposited phosphor coating.

3. The method as specified in claim 2, wherein said alkaline material consists essentially of concentrated ammonium hydroxide.

4. The method as specified in claim 3, wherein said wetting agent consists essentially of $$RC_6H_4O(CH_2CH_2O)_nCH_2CH_2OH$$

in which $n$ is a whole integer and R is one of the group consisting of $C_8H_{17}$ and a higher homolog thereof.

References Cited by the Examiner

UNITED STATES PATENTS 3,006,781  10/1961  Martyny _____ 117—33.5
3,055,767  9/1962   Quirk _____ 252—301.3

OTHER REFERENCES

Carbopol: Supplement No. 7 to "Carbopol 934" bulletin, February 1960, issued by B. F. Goodrich Chemical Co., Cleveland, Ohio.

WILLIAM D. MARTIN, *Primary Examiner.*

MAURICE A. BRINDISI, MURRAY KATZ, *Examiners.*

R. D. EDMONDS, S. W. ROTHSTEIN, P. F. ATTAGUILE, *Assistant Examiners.*